United States Patent [19]

Oda et al.

[11] 3,935,098

[45] Jan. 27, 1976

[54] ADSORBENT PROCESS FOR HEAVY METALS

[75] Inventors: Nakaaki Oda; Yoshio Horie; Mitsuru Idohara; Shozo Iwasa, all of Takaoka, Japan

[73] Assignee: Nippon Soda Co., Ltd., Tokyo, Japan

[22] Filed: June 28, 1973

[21] Appl. No.: 374,341

[30] Foreign Application Priority Data

July 4, 1972 Japan............................... 47-66931

[52] U.S. Cl. .......................... 210/38; 55/72; 55/74; 260/72 R
[51] Int. Cl.² ........................................ B01D 15/00
[58] Field of Search ............. 55/72, 74, 75; 210/24, 210/36, 38; 260/2.2 C, 72 R, 455 A

[56] References Cited

UNITED STATES PATENTS

| | | | |
|---|---|---|---|
| 2,589,209 | 3/1952 | Kardos | 260/72 R |
| 3,274,784 | 9/1966 | Shock et al. | 210/24 |
| 3,755,161 | 8/1973 | Yokota et al. | 210/36 |

*Primary Examiner*—Charles N. Hart
*Assistant Examiner*—Ivars Cintins
*Attorney, Agent, or Firm*—George B. Oujevolk

[57] ABSTRACT

An adsorbent process for heavy metals or heavy metallic compounds, which comprises utilizing a resin prepared by a reaction between aldehydes, dithiocarbamate compounds and aromatic compounds having at least one radical selected from the group consisting of —OH, —SH, —COOH and —COOMe (wherein Me represents sodium, potassium, $NH_4$ or calcium).

6 Claims, No Drawings

ADSORBENT PROCESS FOR HEAVY METALS

This invention relates to a novel absorbent and more particularly this invention relates to a aldehyde-dithiocarbamate-aromatic condensation resin adsorbent for heavy metals and heavy metallic compounds.

Ion-exchange resins and activated charcoal have been employed heretofore in the capture or removal of heavy metals and heavy metallic compounds which are present or contaminate liquids or gases. However ion-exchange resins can capture ionic compounds but cannot do non-ionic compounds and moreover the resins hardly have selectivity of adsorbates. Further, activated charcoal can adsorbs both of non-ionic and ionic compounds but the charcoal has no selectivity of adsorbates. So, ion-exchange resin and activated charcoal are not suited to capture or remove heavy metals or heavy metallic compounds from liquids or gases which contain various kinds of materials. It has been thought to be difficult to selectively capture or remove heavy metals or heavy metallic compounds, which exists in an amount of ppm orders in liquid or gases with other compounds such as non-metallic compounds and light metallic compounds.

Further, dumping of solid waste, which is discharged from mines or factories and contains heavy metals and heavy metallic compounds, causes scattering of heavy metals and heavy metallic compounds, and causes pollution of surroundings.

It is an object of this invention to provide an adsorbent process which selectively adsorbs heavy metals and heavy metallic compounds. It is another object of this invention to provide an economical method to remove or capture heavy metals or heavy metallic compounds from liquids and gases for example service water, river water, drainage or sewage from a factory, laboratory or hospital, air, exhaust gas from cars or a factory, which are sometimes contaminated with heavy metals and heavy metallic compounds.

It is another object of this invention to provide an economical method to prevent surroundings from pollution by heavy metals or heavy metallic compounds.

It is another object of this invention to provide a method to make a slurry or solid wastage which contains heavy metal or heavy metallic compounds, harmless and insoluble and to prevent heavy metal or heavy metallic compounds from exuding.

Other objects of this invention will become apparent from the following specification and claim.

It has been discovered that aldehyde-dithiocarbamate-aromatic compound condensation resins selectively adsorbs heavy metals such as Cd, Cu, Hg, Zn, Pb and Ag, metallic ions thereof, and their metallic compounds. Aldehyde-dithiocarbamate-aromatic compound condensation resins can be prepared by a condensation reaction between dithiocarbamate compounds, aldehydes and aromatic compounds.

In the invention dithiocarbamate compounds which have at least one dithiocarbamate group

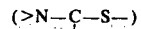

can be employed and the dithiocarbamate group may be combined in the compound in the form of dithiocarbamic acids (R-NHCSSH or

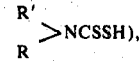

salts between one of basic compounds selected from the group consisting of alkali metals, alkali earth metals and ammonium hydroxide, and carbamic acids (R-NHCSSM or

and ethers of dithiocarbamic acid (R-NHCSSR' or

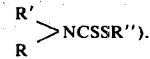

(In these parentheses R and R' show alkyl or aromatic groups having or not having substituent groups, R'' shows low alkyl groups having or not having substituent groups and M shows alkali, alkali earth metals or $-NH_4$)

The following are the typical examples of dithiocarbamate compounds.

ortho (o-)-, meta(m-)- or para(p-)- hydroxylphenyl-dithiocarbamic acid
Phenyldithiocarbamic acid
o-, m- or p- methylphenyldithiocarbamic acid
o-, m- or p- aminophenyldithiocarbamic acid
phenyl-1, 2-(1,3- or 1,4-) di- dithiocarbamic acid
toluene-2-amino-4-(or -6-) dithiocarbamic acid
toluene-2,4-(or -2.6-) di-dithiocarbamic acid
melamine-1-dithiocarbamic acid
melamine-1,3-di-dithiocarbamic acid
melamine-1,3,5-tri-dithiocarbamic acid
2-(3- or 4-) carboxyl-phenyldithiocatbamic acid
2-(3- or 4-) sulfo-phenyldithiocarbamic acid
and alkali metal (e.g. Na and K), alkali earth metal (e.g. Be, Mg, Ca and Ba) or ammonium hydroxide salts of above said acids, and low alkyl groups such as methyl alcohol, ethyl alcohol, propyl alcohol, allyl alcohol and butyl alcohol
ethylene-di-dithiocarbamic acid
tris(dithiocarboxyl)diethylenetriamine
tetra(dithiocarboxyl)triethylenetetramine
penta(dithiocarboxyl)tetraethylenepentamine
tetramethylene-di-dithiocarbamic acid
and ammonium hydroxide salts of above said acid, methyl or ethyl ester of these dithiocarbamic acid.

These dithiocarbamate compounds can be easily prepared from corresponding amine compounds such as aminophenols, anilines, toluidines, diaminobenzenes, melamine and diethylenetriamine, aminobenzoic acid by reacting carbon bisulfide in the presence of a solvent such as acetone, methylethyl ketone and water, and alkaline catalysis such as sodium hydroxide, potassium hydroxide and ammonium hydroxide at a temperature from $-10°C$ to $50°C$.

As a typical aldehyde, formaldehyde, paraformaldehyde, acetaldehyde, glyoxal, acrolein, benzaldehyde, furfural can be employed.

As aromatic compounds in this invention, aromatic compounds having at least one group selected from group of hydroxyl (-OH), thiol(-SH), amino(-$NH_2$), carboxyl(-COOH) and alkali carboxyl (COOMe) (wherein Me is sodium, potassium, $NH_4$ or ½Calcium) is used and typically phenols, thiophenols, naphthols or pyridines, e.g. phenol, thiophenol, naphthol, benzenedithiol, o- (m- or p-) phydroxybenzoic acid and sodium or potassium salt thereof, benzoic acid and sodium or potasium salt thereof, cresol, xylenol, resorcinol, toluenethiol, p-hydroxybenzensulfomic acid, benzylhydrazine, hydroquinone and pyrogallol can be used. Particularly, phenol, cresol, pyrogallol and resorcinol are most preferable.

These aromatic compound give aldehyde dithiocarbamate resin improved chemical resistance and mechanical strength.

In accordance with the invention, the resin can be prepared by reacting one or more aldehyde compounds and one or more dithiocarbamate compounds, and one or more aromatic compounds corresponding to the known process for the preparation of aldehyde-polyamine resins.

The reaction ratio of aldehydes and dithiocarbamate compounds can be chosen freely providing that resinous material can be obtained, however, preferably 0.8 – 6.0 preferably 1.5 – 3.0 mole of aldehydes can be employed with 1 total mole of dithiocarbamate compounds and aromatic compounds. In the reaction acids or alkali substances such as NaOH, NH$_4$OH, H$_2$SO$_4$ and HCl preferably employed as a reaction catalysis. The reaction can be completed at a temperature from about 20°C to about 120°C for about 10 minutes to 10 hours. Solid resinous material is obtained from reaction mixture via gelatinous mixture.

Preferably 1 total mole of dithiocarbamate compounds and aromatic compounds in a ratio of 0.1 – 0.8 mole of dithiocarbamate compounds and 0.2 – 0.9 mole of aromatic compound can be employed for 1.5 – 3.0 mole of aldehydes.

The order of adding aldehydes, dithiocarbamates and aromatic compounds are not limited. For example to a certain extent the methylol reaction is carried on by reacting aldehydes and aromatic compounds at the start and then dithiocarbamates are mixed with the reaction mixture. Another method for the preparation is proposed. In the method, preparation of dithiocarbamates compound from corresponding amines is carried out in the course of the preparation of the resins. For example, corresponding amines and aromatic compounds are mixed together in a solvent of water or an organic solvent containing alkaline catalysis or ammonium hydroxide and under vigorous agitation carbon bisulfide is introduced into the mixture and then aldehyde is reacted with dithiocarbamate produced in the reaction mixture. Ordinarily aldehyde is gradually or divisionally added in order to carry out a homogeneous reaction. Further mineral alkalis such as NaOH, KOH and NH$_4$OH and mineral acids such as HCl and H$_2$SO$_4$ can be employed for the completion of the condensation reaction.

Additives such as surfactant, foaming agent, clolarant etc. can be employed, if desired in the invention.

The resin can be arranged in several forms to suit the desired use, for example, into the shape of beads, foamed plastics, granules or powder etc. For example, after a completion of condensation reaction resinous reaction mixture is pulverized into powder or granules and then the powder or granule is dried at about 60°C to 100°C, or fine spherical particle of powder are obtained by suspension polymerization in a solvents such as carbon tetrachloride, benzene, monochlorobenzene, trichloroethylene.

Further, various kinds of means can be employed in order to enlarge specific surface area (m$^2$/g) of the resin and to heighten the capacity of the adsorption.

The means depend on the properties of the resin and the means may be sometimes very troublesome particularly when the resin is tough and the formed resin has closed cells (foams).

One of the best means to heighten the capacity of adsorption is to use a carrier which holds the resin in an impregnated state or as a covering on the surfaces of the carrier.

The resin with the carrier can be preferably prepared by following method.

Aldehydes, dithiocarbamates and aromatic compound are respectively or simultaneously impregnated into the carrier and made to coexist in the carrier and then polycondensation reaction is completed in the carrier at about 20°C to 120°C.

When aldehydes, dithiocarbamates and aromatic compounds or mixture thereof have not sufficient fluidity to impregnate into the carrier, an appropriate solvent may be employed and preferably water, ketones e.g. acetone, methylethylketone, methylisobutyl ketone, alcohols e.g. methylalcohol, and tetrahydrofran can be used.

If desired, the mixture may be a little polymerized to form a prepolymer in the solution prior to the impregnation, however the polymerization should not be carried out to the extent that a large amount of turbidity appears in the solution.

The impregnation should be carried on in order to contain resin at a desired amount of 0.1 percent to 100 percent preferably 5 percent to 30 percent by weight to carrier weight and for this purpose, the solution of the mixture is preferably prepared in concentration from 0.1 percent to 50 percent by weight. Ordinary methods, for example, dipping and spraying are used for the impregnation. In order to facilitate the impregnation, if desired, the carrier may be dried, heated or air in the carrier is removed under reduced pressure. After the impregnation, if necessary, excess amounts of monomer such as aldehydes, dithiocarbamates, and/or aromatic compounds or mixture thereof or a prepolymer which exists on the surfaces of the carrier may be rinsed with solvent or may be centrifuged.

The polycondensation can be completed by heating, after the removal of solvent used or by heating combining removal of the solvent, at high temperature preferably at about 60°C to 120°C for more than about 30 minutes preferably 1 hours to 10 hours so as to increase the adsorption capacity.

As for carriers, many kinds of materials having porous structure and wide surfaces can be employed and preferably porous materials having large specific surfaces more than 1m$^2$/g (BET's method by argon gas), for example, diatomaceous earth, pumice stone, zeolite, kaolin, vermiculite, alumina (aluminum oxide), silicagel, coke, activated charcoal, graphite, bentonite, foamed urethane resins having open cell, are used as a carrier and if an inorganic carrier is used, carriers preferably having 2.0 mm to 0.05 mm in diameter are employed.

The resin in the carrier is presented following the fine porous structure of the carrier and has large specific surfaces to an extent more than 1.0m$^2$/g. The specific surfaces of the carrier may be reduced and the reduction of the surfaces sometimes goes up to 70 percent to 85 percent of un-treated carrier, but it gives no difficulty in this invention.

When a resin adsorbent is used, various conventional method for adsorption can be employed, for example, the resin adsorbent is contacted with the liquids or gases which to be treated in a batchwise operation, packed tower or layer systems, fluid bed operation etc., and in packed tower or layer system, liquids are ordinary passed through at a rate of 2 to 30 of SV (space velocity) preferably 5 to 15 of SV and gases are ordinary passed at 2 to 25m/min preferably 5 to 15mm/min.

The resin adsorbent in the invention can be further activated by dipping in pure water for several days or by treating with acidic or alkaline aqueous solution.

In this treatment acidic or alkaline aqueous solution having concentrational N to 12 N preferably 5 N to 10 N for 1 to 10 hours can be employed. As an acid or alkali, aqueous solution of mineral acid e.g. hydrochloric acid, phosphoric acid, sulfuric acid, nitric acid, sulfurous acid, perchloric or inorganic alkali compound e.g. sodium hydroxide, potassium hydroxide, ammonia can be preferably used for dipping and preferably the resin treated is rinsed with water to the extent that the water used for rinsing has pH amount 4 to 8 preferably 6 to 7.

The resin absorbent can selectively adsorb heavy metal and heavy metallic compounds such as nickel, chromium, zinc, lead copper, cadomium, silver, gold, strontiumand mercury particularly mercury and compound thereof from liquids or gases to the extent of detectable concentrations of 0.01 to 0.001 ppm, even if these heavy metal or metallic compound exists with other metallic compound and the adsorbing ability lasts long and further the capacity is large to the extent that the resin can adsorb 3 to 33 percent by weight for the resin even if silver compounds and mercuric compounds are nonionic or ionic compounds e.g. metallic oxides e.g. HgO, $Ag_2O$, metallic chlorides e.g. $HgCl_2$, AgCl, $HgSO_4$, $Hg(NO_3)_2$, $Ag_2SO_4$, $HgCO_3$, $Hg_2SO_4$, HgS, $Hg_2S$, $Hg_2$, $(NO_3)_2$, organometallic compound e.g. methylmercury chloride, ethylmurcury chloride, phenylmercuric acetate, ethylmurcury iodide, methylmurcury iodide, ethylmurcury bromide, methylmurcury fromide, phenylmurcury chloride, diphenylmurcury, phenylmurcury benzoate.

Furthermore cadmium and cadmium compounds are especially adsorbed by the resin even if cadmium compounds are nonionic or ionic e.g. $CdSO_4$, $CdCl_2$, CdS, CdO, $Cd(OH)_2$.

Mercuric compounds and silver compounds are effectively adsorbed when aqueous solution contains such compound at pH 1 to 10 especially and cadmium compounds are effectively adsorbed when the aqueous solution is pH 3 to 11 especially at pH 7 to 10, and copper compounds are effectively adsorbed at pH 1 to 11 especially at pH 5 to 11, and lead compounds are effectively adsorbed at pH 2 to 11, and zinc compounds are effectively adsorbed at pH 5 to 11 especially pH 7 to 11 and cobalt compounds are effectively adsorbed at pH 5 to 11 especially at pH 9 to 11.

The resin adsorbent can be used for various purposes using the characteristic properties. For example, the adsorbend is used for removal of heavy metals and heavy metallic compounds and captured or recovery of heavy metals from liquid and gases e.g. service water, river water, waste water of factory, laboratory or hospital, or from organic solvent or acidic aqueous solution e.g. $H_2SO_4$ or HCl, which sometimes contains heavy metal, and fixation of heavy metal and heavy metallic compounds.

After adsorption of heavy metallic compound adsorbing capacity of the resin can be recovered by rinsing aqueous alkali solution such as 1/10 normal to ½ normal of sodium hydroxide and resin which is saturated by cadmium compound or zinc compounds are especially recovered.

The resins in this invention have some novel usages besides the conventional usages as an adsorbent. For example, when a slurry or granular waste containing heavy metals of heavy metallic compounds such as mud containing mercuric compound by-produced in an electrolysis plant of alkalichloride by mercury cell is sometimes treated to be packed in a concrete box in order to dump it in the sea or to bury it in the ground, heavy metal or heavy metallic compounds are exuded out through the walls of the concrete box by extraction with water and then pollute the surroundings. In that case mixing the resin and the waste at a ratio of 0.1 to 50 percent of the resin in the waste completely prevents the exudation of harmful heavy metal and heavy metallic compounds and further when the resin is homogeniously mixed in concrete or mortar in an amount of 0.1 percent to 50 percent preferably 0.5 to 20 percent for cement, which is used in the concrete or mortar, the resin checks and prevents heavy metals and heavy metallic compounds from passing through the cement or mortar walls. Moreover solidifying material, which solidifies to be hard, for example, cement e.g. Portland cement, or raw material of resin, containing 0.1 percent to 50 percent preferably 1 percent to 20 percent of the resin adsorbent can be used for packing of the harmful heavy metallic component and further, walls or constructions made by such solidifying material prevent heavy metals and heavy metallic compounds from passing through the walls or the constructions such as pipes for drainage.

The effects of the present invention will be shown in the following Example. All quantities described in this specification and the appended claims as "parts" or "percent" refer to "parts by weight" or "percent by weight" unless expressly stated otherwise.

EXAMPLE 1

Preparation of resin:

55 parts of lesorcinol were mixed with 1000 parts of water and then 202 parts of 37 percent aqueous solution of formaldehyde was added and PH of the solution was adjusted at 8 by adding NaOH aqueous solution and pale brown solution [I] was obtained after agitation for 30 minutes at 60°C.

On the other hand, 55 parts of m-aminophenol was dissolved in 520 parts of aqueous solution containing 20 parts of NaOH and in the aqueous solution 38 parts of carbon bisulfide was added dropwise at 35°C to 40°C under vigorous agitation. Aqueous orange solution [II] containing about 6.4 percent by weight of benzoildithiocarbamate was obtained.

Then the orange solution [II] was added dropwise in the brown solution [I] and temperature of the reaction mixture rose at 50°C to 60°C and resinous material was obtained via orange yellow gelatinous. The resinous material was crashed into 20 – 50 mesh and red-brown granulars were obtained by drying at 80°C.

The obtained granular resin adsorbent was dipped in distilled water and swelled, and adsorbent [α] was prepared.

On the other hand, the granular resin adsorbent was dipped in 1/10 normal aqueous solution of HCl for 45 hours and adsorbent [β] was obtained.

ADSORPTION A:

In 3 liters of aqueous wastage containing 20 ppm of cadmium (mainly as CdSO₄), 3 g of ammonium sulfate was added as a buffer solution and then PH was adjusted at 9 by adding ammonium hydroxide and after one night, the aqueous wastage was filtered through diatom earth and transparent aqueous wastage containing 9.9 ppm of cadmium at PH 8.8 was obtained.

1. 70 ml of adsorbent [α] was packed in a glass tube having a diameter of 15 mm and a length of 400 mm and the above said transparent aqueous wastage was passed through the leyer of the adsorbent in the glass tube at SV (space velocity) of 2 and cadmium concentration of the effluent was measured by emission spectro analysis. Results were shown as follows.

Table 1

| amount of treated effluent (ml) | PH of the effluent | Cadmium concentration (ppm) |
|---|---|---|
| 100 – 200 | 8.4 | 0.01 |
| 300 – 400 | 8.5 | less than 0.01 |
| 2,300 – 2,400 | 8.5 | Dot |
| 2,900 – 3,000 | 8.5 | Dot |

2. 0.05 g, 0.1 g 0.5 g or 1.0 g of adsorbent [β] was added in each 400 ml of the above said transparent aqueous wastage and after 5 hours of shaking the treated wastage and filtered through filter paper and cadmium concentration of the wastage was measured by emission spectro analysis. Results were shown as follows.

Table 2

| amount of adsorbent (g) | PH of treated aqueous wastage | cadmium concentration (ppm) | amount of cadmium adsorbed by 1 g of adsorbent (mg/g) |
|---|---|---|---|
| 0.05 | 8.8 | 14 | 40 |
| 0.1 | Dot | 11 | 32 |
| 0.5 | Dot | 1.5 | 14 |
| 1.0 | Dot | 0.4 | 7.4 |

ADSORPTION B:

Aqueous solution containing 10 ppm mercury in a state of mercuric chloride was adjusted at PH 3 by adding HCl aqueous solution and in each 100 ml of the solution 0.1 g or 0.5 g of adsorbent [β] was added and after 5 hour shaking at 30°C and following 19 hours on standing the solution was filtered and concentration of mercury was measured by emission spectro analysis and 0.003 ppm and 0.001 ppm was obtained as the results. 0.5 g of powder of activated carbon was repeated instead of above said adsorbent [β] and mercury content was 0.27 ppm.

EXAMPLE 2

Preparation of resin:

Aldehyde and aromatic compound were mixed and reacted to the extent that little amount of turbidity appeared at 40°–95°C for 0.5 to 3 hours in the presence or organic solvent or water, and further dithiocarbamate and sodium hydroxide or ammonium hydroxide as a catalyst were added to the reaction mixture and optionally the mixture was soaked in carrier and then the mixture was heated at 40°C to 110°C for 0.5 to 5 hour and after milling a reaction mixture, adsorbent [α] having particle size of 20 to 40 mesh (Tyler) was obtained. The adsorbent was dipped in 0.05–1.0 normal of hydrochloric acid solution for 12 hours and rinsed with water. On the other hand, the adsorbent [α] was dipped in 1/10 normal aqueous solution of NCl and after rinsing with water adsorbent [β] was obtained.

ADSORPTION:

The adsorbents were tested the adsorption effect for copper, mercury, silver, zinc, lead nickel, chlomium, strontium and cadmium.

70 ml of each adsorbent was packed in glass tube having 15 mm in diameter and 30 liter of aqueous solution containing heavy metallic compound was passed at SV : 5 and content of metal in last one liter of effluent aqueous solution was estimated.

AQUEOUS SOLUTION

| copper | : 10 PPM of CuSO₄ aqueous solution at PH5 |
| mercury | : (A) 10PPM of HgCl₂ aqueous solution at PH7 |
| | (B) 1PPM of CH₃HgCl aqueous solution at PH3 |
| cadmium | : 2PPM of CdSO₄ aqueous solution at PH8.5 |
| silver | : 10PPM of AgNO₃ aqueous solution of PH5.0 |
| Strontium | : 10PPM of SrCl₂ aqueous solution at PH9 |
| chromium | : 10PPM of CrCl₃ aqueous solution at PH9 |
| nickel | : 10PPM of NiCl₂ aqueous solution at PH9 |
| lead | : 10PPM of Pb(NO₃)₂ aqueous solution at PH5 |
| zinc | : 10PPM of ZnSO₄ aqueous solution at PH8 |

The results and adsorbents with methods of preparation were shown in Table 3.

Table 3

| | adsorbent raw material (mole) | | | | |
|---|---|---|---|---|---|
| Run | dithio carbamates | aldehyde | aromatic compound | carrier (resinx100/carrier) | adsorbent [style] |
| 1 | sodium toluene-2,4-di-dithio-carbamate (0.4) | form-aldehyde (2.0) | resorcinol (0.6) | — | β |
| 2 | ″ | ″ | ″ | — | α |
| 3 | ″ | ″ | ″ | diatom earth (15) | α |
| 4 | sodium toluene-di-dithiocarbamate (0.5) | furfural (2.0) | resorcinol (0.5) | — | β |
| 5 | sodium m-hydroxyl-phenyl dithio-carbamate (0.4) | form-aldehyde (2.0) | resorcinol (0.6) | — | α |
| 6 | phenyldithiocarbamic acid (0.4) | form-aldehyde (2.5) | cresol (0.6) | zeolite (15) | β |

Table 3-continued

| Run | adsorbent raw material (mole) dithio carbamates | aldehyde | aromatic compound | carrier $\left(\dfrac{\text{resin} \times 100}{\text{carrier}}\right)$ | adsorbent [style] |
|---|---|---|---|---|---|
| 7 | sodium-m-hydroxyl phenyldithiocarbamate (0.3) | form-aldehyde (2.0) | resorcinol (0.7) | diatom earth (15) | β |
| 8 | sodium m-hydroxyl phenyldithiocarbamate (0.5) | furfural (1.5) | resorcinol (0.5) | — | β |
| 9 | sodium phenyl-1,3-di-dithiocarbamate (0.3) | form-aldehyde (2.0) | resorcinol (0.7) | — | β |
| 10 | " (0.4) | furfural (2.0) | resorcinol (0.6) | — | α |
| 11 | sodium-m-hydroxyl-phenyl dithio-carbamate (0.4) | form-aldehyde (2.0) | hydroquinone (0.6) | — | β |
| 12 | potasium-p-phenyl-dithio carbamate (0.2) | furfural (2.5) | hydroquinone (0.8) | — | α |
| 13 | ammonium-o-amino-phenyl dithio-carbamate (0.1) | acet-aldehyde (2) | resorcinol (0.9) | — | β |
| 14 | sodium-2-amino-4-dithio carbamate (0.1) | form-aldehyde (2) | resorcinol (0.9) | — | α |
| 15 | sodium phenyl-1,3-di-dithiocarbamate (0.3) | form-aldehyde (3) | resorcinol (0.7) | — | α |
| 16 | sodium melamine-1-dithio carbamate (0.6) | form-aldehyde (2.5) | phenol (0.4) | — | β |
| 17 | ammonium ethylene-diamine-1,4-di-dithio carbamate (0.3) | form-aldehyde (2.0) | resorcinol (0.7) | — | α |
| 18 | sodium benzoate-4-sodium dithio-carbamate (0.5) | furfural (2.0) | pyrocatechin | — | α |
| 19 | sodium benzene-sulfonate-2-sodium dithiocarbamate (0.4) | form-aldehyde (2.5) | resorcinol (0.6) | — | α |
| 20 | tetramethylenebis-dithio carbamic acid (0.6) | form-aldehyde (2.0) | phenol (0.4) | diatom earth | α |
| 21 | ethyldithiocarbamate (0.7) | form-aldehyde (2.0) | cresol (0.3) | — | α |
| 22 | sodium benzene-sulfonate-2-sodium dithiocarbamate (0.3) | benz-aldehyde (2.0) | meta-amino-phenyl (0.7) | — | α |

| Run | adsorbent effect concentration (ppm) | | | | | | | | | |
|---|---|---|---|---|---|---|---|---|---|---|
| | Hg A | Hg B | Ag | Cu | Pb | Zn | Cd | Ni | Cr | Sp |
| 1 | less than 0.001 | less than 0.001 | less than 0.02 | less than 0.02 | less than 0.2 | less than 0.01 | less than 0.01 | — | — | — |
| 2 | 0.001 | — | " | " | " | " | " | less than 0.05 | less than 0.2 | less than 0.1 |
| 3 | 0.003 | — | " | " | — | " | " | " | — | — |
| 4 | less than 0.001 | less than 0.001 | " | " | less than 0.2 | — | — | — | less than 0.2 | — |
| 5 | " | 0.003 | " | " | " | less than 0.01 | " | " | " | less than 0.1 |
| 6 | — | 0.01 | " | — | " | — | — | — | — | — |
| 7 | 0.003 | 0.001 | " | less than 0.02 | " | — | — | — | less than | 0.2 |
| 8 | less than 0.001 | less than 0.001 | " | " | " | — | less than 0.03 | — | — | — |
| 9 | " | " | " | " | " | — | " | — | — | — |
| 10 | " | — | " | " | " | 0.01 | less than 0.01 | less than 0.05 | less than 0.2 | less than 0.1 |
| 11 | 0.003 | 0.002 | " | " | " | — | — | — | — | — |
| 12 | 0.015 | — | " | 0.05 | — | 0.05 | 0.04 | — | — | — |
| 13 | 0.021 | — | " | — | — | — | — | — | — | — |
| 14 | 0.003 | 0.002 | " | less than 0.02 | less than 0.2 | less than 0.01 | less than 0.01 | less than 0.05 | — | — |
| 15 | — | 0.003 | " | " | " | " | " | — | — | — |

Table 3-continued

| Run | adsorbent raw material (mole) dithio carbamates | aldehyde | aromatic compound | carrier | $\left(\frac{resin \times 100}{carrier}\right)$ | adsorbent [style] | | |
|-----|------|------|------|------|------|------|------|------|
| 16 | 0.010 | — | " | " | — | — | — | — | — |
| 17 | 0.026 | — | " | 0.02 | — | 0.05 | less than 0.01 | less than 0.05 | — |
| 18 | 0.026 | — | " | 0.02 | — | 0.05 | " | " | — |
| 19 | 0.005 | — | " | 0.05 | — | — | 0.06 | — | — |
| 20 | 0.017 | — | " | — | — | — | 0.3 | — | — |
| 21 | 0.012 | — | 0.02 | 0.04 | — | — | 0.05 | — | — |
| 22 | 0.008 | — | less than 0.02 | 0.03 | — | — | 0.07 | — | — |

We claim:

1. A process for adsorbing heavy metals or heavy metallic compounds which comprises contacting liquid or gas containing heavy metal or heavy metallic compounds with a resin prepared by a reaction between an an aldehyde, a dithiocarbamate compound and an aromatic compound having at least one group selected from —OH, —SH, —NH$_2$, —COOH, and —COOMe wherein Me represents sodium, potassium, NH$_4$ or calcium.

2. A process set forth in claim 1 and wherein 0.8 – 6.0 mole of aldehyde and 1 total mole of dithiocarbamate compound and aromatic compound in a ratio of 0.1 to 0.8 mole of dithiocarbamate compound and 0.2 to 0.9 mole of aromatic compound is employed, and wherein the dithiocarbamate compound is a compound selected from the group of hydroxphenyldithiocarbamic acid, phenyl dithiocarbamic acid, methyl aminophenyl dithiocarbamic acid, melamin dithiocarbamic acid, ethylenediamine-1,4-dithiocarbamic acid, toluene-di-dithiocarbamic acid, benzenesulforic acid, dithiocarbamic acid and alkali salts thereof.

3. A process as set forth in claim 1 wherein 0.8 – 6.0 mole of aldehyde and 1 total mole of dithiocarbamate compound and aromatic compound in a ratio of 0.1 to 0.8 mole of dithiocarbamate compound and 0.2 to 0.9 mole of aromatic compound are employed and wherein the aldehyde is a compound selected from a group of formaldehyde, paraformaldehyde, acetaldehyde, glyoxal, furfural and benzaldehyde.

4. A process with a resin as set forth in claim 1 and wherein 0.8 – 6.0 mole of aldehyde and 1 total mole of dithiocarbamate compound and aromatic compound in a ratio of 0.1 to 0.8 mole of dithiocarbamate compound and 0.2 to 0.9 mole of aromatic compound is employed and wherein the aromatic compound is a compound selected from the group of phenol, resorcinol, cresol and hydroquinone.

5. A process for fixing heavy metal or heavy metallic compound which comprises mixing (A) a slurry or mud containing a heavy metal or heavy metallic compound and (B) an adsorbent for heavy metals or heavy metallic compound which comprises a resin prepared by a reaction between an aldehyde, dithiocarbamate compound and an aromatic compound having at least one group selected from —OH, —SH, —NH$_2$, —COOH, —COOMe, wherein Me represents sodium, potassium, NH$_4$ or calcium and wherein 0.8 – 6.0 mole of aldehyde and 1 total mole of dithiocarbamate compound and aromatic compound in a ratio of 0.1 to 0.8 mole of dithiocarbamate compound and 0.2 to 0.9 mole of aromatic compound are employed, and wherein the dithiocarbamate compound is a compound selected from the group consisting of hydroxyphenyl-dithiocarbamic acid, phenyl dithiocarbamic acid, methylphenyl dithiocarbamic acid, aminophenyl dithiocarbamic acid, phenyl-di-dithiocarbamic acid, methyl aminophenyl dithiocarbamic acid, melamin dithiocarbamic acid, ethylenediamine-1,4-dithiocarbamic acid, toluene-di-dithiocarbamic acid, benzenesulforic acid, dithio-carbamic acid and alkali salts thereof.

6. A process for fixing heavy metal or heavy metallic compounds, which comprises mixing (A) slurry or mud containing heavy metal or heavy metallic compound and (B) a cement composition for fixing heavy metals or heavy metallic compounds, which comprises a resin prepared by a reaction between an aldehyde, a dithiocarbamate compound and an aromatic compound having at least one group selected from —OH, —SH, —NH$_2$, —COOH, —COOMe wherein Me represents sodium, potasium, NH$_4$ or calcium.

* * * * *